(12) United States Patent
Laserson et al.

(10) Patent No.: US 11,436,633 B2
(45) Date of Patent: Sep. 6, 2022

(54) MACHINE LEARNING PREDICTIVE DEVIATION AND REMEDIATION

(71) Applicant: NCR Corporation, Atlanta, GA (US)

(72) Inventors: Itamar David Laserson, Givat Shmuel (IL); Avishay Farbstein, Bruchin (IL)

(73) Assignee: NCR Corporation, Atlanta, GA (US)

( * ) Notice: Subject to any disclaimer, the term of this patent is extended or adjusted under 35 U.S.C. 154(b) by 415 days.

(21) Appl. No.: 16/455,270

(22) Filed: Jun. 27, 2019

(65) Prior Publication Data
US 2020/0410534 A1     Dec. 31, 2020

(51) Int. Cl.
*G06Q 30/02*        (2012.01)
*G06N 20/00*        (2019.01)

(52) U.S. Cl.
CPC ......... *G06Q 30/0254* (2013.01); *G06N 20/00* (2019.01); *G06Q 30/0202* (2013.01)

(58) Field of Classification Search
CPC . G06Q 30/0254; G06Q 30/0202; G06N 20/00
See application file for complete search history.

(56) References Cited

U.S. PATENT DOCUMENTS

| | | | | |
|---|---|---|---|---|
| 2011/0313900 | A1* | 12/2011 | Falkenborg | G06Q 40/025 705/30 |
| 2015/0278837 | A1* | 10/2015 | Lahav | G06Q 30/0204 705/7.33 |
| 2018/0018684 | A1* | 1/2018 | Orr | G06Q 30/0202 |
| 2020/0327449 | A1* | 10/2020 | Tiwari | G06Q 30/0202 |

OTHER PUBLICATIONS

Khodabandehlou, S., & Rahman, M. Z. (2017). Comparison of supervised machine learning techniques for customer churn prediction based on analysis of customer behavior. Journal of Systems and Information Technology, 19(1), 65-93. doi:http://dx.doi.org/10.1108/JSIT-10-2016-0061. (Year: 2017).*

* cited by examiner

*Primary Examiner* — Eric W Stamber
*Assistant Examiner* — Alissa D Karmis
(74) *Attorney, Agent, or Firm* — Schwegman, Lundberg & Woessner

(57) ABSTRACT

A machine-learning algorithm is trained with features relevant to a modeled set of input directed to patterns of activities specific to a given behavior. The trained algorithm is also trained on success and failures of remediation actions that change or do not change the given behavior. The trained algorithm is then provided the modeled set of input at predefined intervals of time and supplies as output expected deviations/changes that are predicted for the given behavior along with an indication as to whether the remediation actions are likely to prevent or change the expected behaviors.

7 Claims, 7 Drawing Sheets

Customer

| Customer # visits | Total Shopping Value | Customer Service incidents | Duration of shopping trips | Avg scan interval | ... | MH1 | MH2 | ... | MH100 |
|---|---|---|---|---|---|---|---|---|---|
| 8 | $9.98 | 3 | 700 sec | 175 sec | | 2 | 0 | | 0 |

FIG. 1D

MACHINE LEARNING PREDICTIVE DEVIATION AND REMEDIATION

BACKGROUND

Increasingly retailers are relying on customer collected data and technology to manage customer relationships. The amount of data gathered by retailers is staggering and access to that data is available at any time and from virtually any location on any device. However, to extract useful information from the data requires specialized automation and customized programming. As a result, acquiring timely and useful information remains an elusive goal for many retailers.

One area of concern for retailers is customer turnover (referred to as "customer churn"). This is where a loyal customer gradually stops frequenting a previously preferred retailer and begins to do more and more business with a competitor retailer. Retailers have discovered that efforts and resources expended on retaining loyal customers is substantially less expensive then attempting to attract new customers. A typical retailer will also experience about a 15% customer loss in any given year as a result of customer churn.

Many attempts have been made to predict or estimate customer churn for purposes of making proactive attempts to mitigate customer churn rates. To date, such attempts have all been unsuccessful, even in view of the ever-increasing amount of customer data that organization capture and analyze for each of their customers.

SUMMARY

In various embodiments, methods and a system for machine learning predictive deviations and remediations are presented.

According to an embodiment, a method for machine learning predictive deviation and remediation is presented. Specifically, and in one aspect, a modeled pattern for a behavior along with activity data associated with the behavior is received for a given interval of time. Output is produced as an expected behavior based on the modeled pattern and the activity data; the expected behavior has not yet occurred.

BRIEF DESCRIPTION OF THE DRAWINGS

FIG. 1D is an example set of input parameters used to train and to use the machine-learning predictor, according to an example embodiment.

DETAILED DESCRIPTION

Figure 1A:
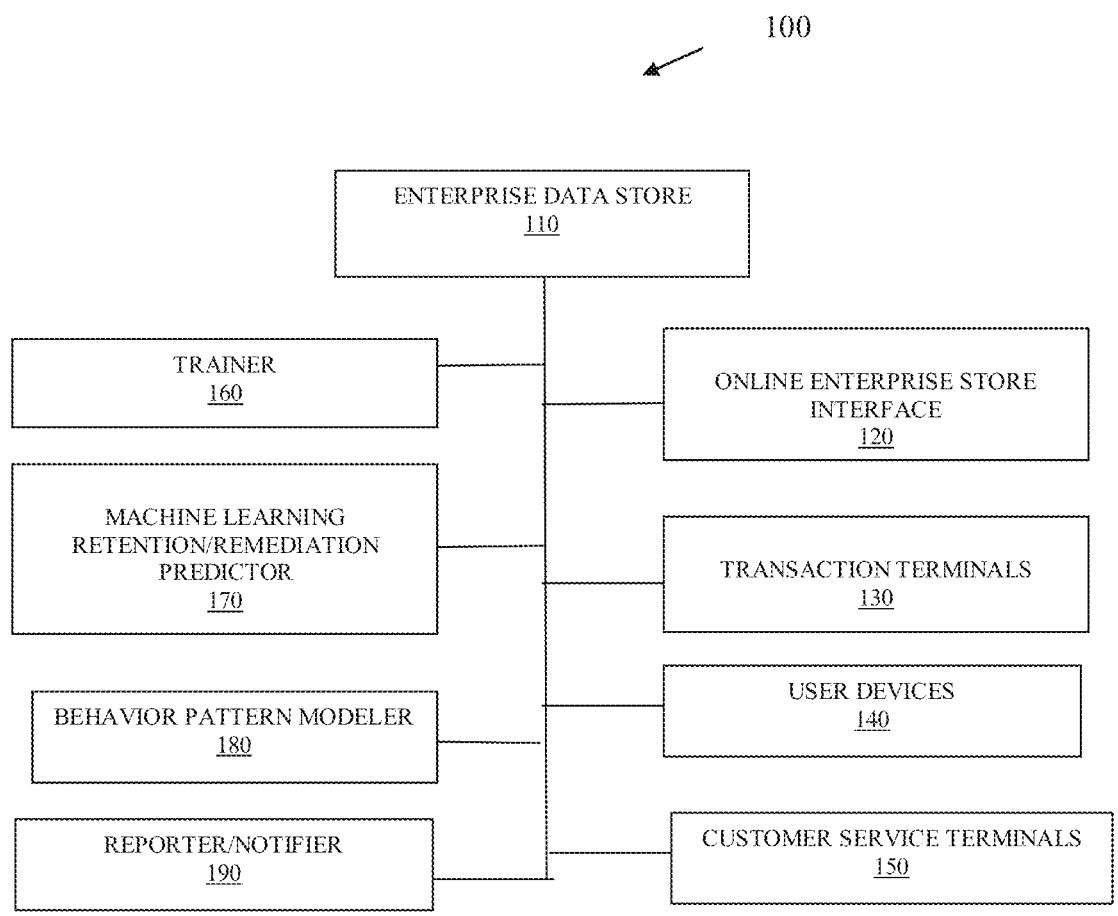
FIG. 1A is a diagram of a system for machine learning predictive deviation and remediation, according to an example embodiment.

FIG. 1A is a diagram of a system 100 for machine-learning predictive deviation and remediation, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or less components are possible without departing from the teachings of machine-learning predictive deviation and remediation presented herein and below.

The system 100 provides a mechanism by which a machine-learning algorithm can be trained with modeled pattern activity for a given behavior of a customer and once trained predict whether a deviation in that behavior is expected along with an indication as to whether remedial efforts are likely to be successful in avoiding the deviation on the customer. The system is particularly useful in predicting customer churn and prediction whether customer retention incentives will prevent the customer churn from occurring in the future.

The system 100 includes, an enterprise data store 110, an online enterprise store interface 120, a plurality of transaction terminals 130, user devices 140, a plurality of customer service terminals 150, a machine-learning trainer 160, a machine-learning retention/remediation predictor (herein after just "predictor") 170, a shopping or behavior pattern modeler 180, and a reporter/notifier 190.

The trainer 160, the predictor 170, the modeler 180, and the reporter/notifier 190 are executable instructions that reside in a non-transitory computer-readable storage medium. The executable instructions are executed by one or more hardware processors of computing devices. This causes the processed to perform the processing discussed herein and below for 160-190.

The online enterprise store interface 120, the transaction terminals 130, user devices 140, and customer service terminals 150 comprise a plurality of hardware devices that execute software as services provided throughout the enterprise over one or more networks (wired, wireless, and/or a combination of wired and wireless).

The enterprise data store 110 captures data gathered throughout the enterprise by the services. One type of data housed in the data store 110 includes transaction data for transactions conducted on the transaction terminals. The transaction data includes sale price, item detail, transaction date, transaction time of day, transaction day of week, store identifiers for stores associated with each transaction, transaction terminal identifiers, and the like. The data store 110 also includes item inventory, item description, item store location, item shelf location within the store, product categories, product catalogue, etc. Further, the data store 110 includes a variety of other data such as customer item returns, customer visits to service terminals 150, customer visits to online stores of the enterprise, customer visits to brick-and-mortar stores of the enterprise, customer account details, holiday dates, weather in a particular location on a particular date, sporting event on a given date, any catastrophic newsworthy events observed for a given date.

The enterprise data 110 includes historical transaction data for the enterprise that spans one to several years' worth of transaction data.

As a customer contacts the enterprise for purposes of performing a transaction (purchase, return, refund, or complaint), those contacts and details of the contacts are recorded in the historical transaction data. The contacts can be in person through the transaction terminals 130, online through the online interface or either in person or remote from the store through user devices 140. Each contact is record along with the relevant detail of the contact with the data store 110 as part of the transaction history.

The modeler 180 processes the transaction histories provided in the data store 110 (each of 120-150 can update transaction data in real time to the data store 110). The modeler 180 generates, derives, and creates a shopping pattern for each customer of the enterprise using the transaction data. The shopping pattern is used for both training the predictor 170 (via the trainer 160) and used when the predictor is fully trained as input to receive as output (provided to the reporter/notifier 190) indications on a customer that is predicted to be nearing a point of abandoning or substantially abandoning business with the enterprise along with an indication as to whether remedial efforts made by the store are going to be likely successful in preventing the customer from abandoning or substantially abandoning business with the enterprise.

Existing attempts to detect customer churn are not timely, such that by the time churn is detected it is too late and the customer likely cannot be recovered. These existing attempts also do not account for shopping patterns and typically just use raw customer data that is unmodeled or preprocessed in any significant manner. As a result, these approaches have been largely untimely and unsuccessful.

The retail business is very competitive, one of the key methods for retailers for drawing new customers into their stores is by producing aggressive (and temporary) promotions. Such promotions often encourage customers to break their old shopping patterns and visit the competitors. Once the customer visits the competitor several times, they are at high risk to churn. When shopping patterns are captured within the model, certain behaviors are detected that were missed in past solutions. For example, if a certain customer that normally shop in the dairy department for $20-$40 per week had reduced the shopping in that department alone (due to a comparative's promotion), the generated shopping pattern by the modeler 180 will capture this information at a very early stage. If previous incidents suggest that this type of behavior is a strong indicator for churn it will trigger an alert for this customer through the reporter/notifier 190. In the traditional approaches, such a small deviation in the overall customer expenditure would be missed, failing to produce precise churn prediction at an early enough stage for the retailer to respond.

It is to be noted that this is just one example of how modeling the shopping pattern as input to the predictor 170 for purposes of training through the trainer 160 is superior to existing approaches that have been taken in the industry.

Modules 160-190 provides a novel solution by leveraging the significance of shopping patterns in conjunction with other conventional approaches to provide an enhanced and more accurate prediction of customer churn at an early enough stage where the customer can be retained through promotions or other remediations.

As used herein "customer churn point" is a moment in time that a customer's behavior indicates a substantial reduction in business with a given enterprise. So, churn point is a point in time after which an expected amount of spending by the customer in a given month drops by a predefined percentage (which can be configured). Any customer in which this is detected is determined to be a "defector" from the enterprise's business. In this way, unlike previous approaches the customer does not have to have had completely halted business with the enterprise; rather a deviation by a configurable amount within a given month can determine and predict a defector.

Customers of the enterprise can then be labeled as either defectors or non-defectors by passing through each customer's transaction history, deriving a current shopping pattern, and classifying each customer as either a defector or a non-defector based on evaluating customer spending habits during a configured period of months.

The modeler 180 derives the shopping patterns as a data structure comprising: 1) a total distribution of quantity of items purchased by a given customer across product categories of the enterprise; 2) total distribution of cost of items purchased by the given customer across all product categories; 3) total distribution of items purchased by the customer across all channels (cashier-assisted terminals or Point-Of-Sale (POS) transaction terminals 130, Self-Service or Self-Service Terminals 130, online interfaces 120 for online transactions over the web (ecommerce), and customer service terminals 150 for returns and refunds); 4) total distributions of savings (promotions and/or discounts) given to the customer across all product categories; and 5) total time per dollar spend by the customer during all shopping trips of the customer to the enterprise.

These distributions over a given period of time (on a monthly interval of time), are provided as input to train the predictor 170 along with other features, such as: 1) number of customer visits per a given time period; 2) total value of customer's transaction per the given time period; 3) total number of items purchased by the customer per the given time period; total number of customer returned items to the enterprise; 4) total number of incidents where the customer visited a customer service desk, such as via the customer service terminals 150; and 5) time intervals between the customer's visits to the enterprise's stores.

The predictor 170 is also trained determining whether remediation or retention efforts (such as through promotions) will be successful or not. That is, some customers are easier to retain while others may be indifferent to retention efforts. This is another important feedback to train the predictor 170 on. Customers that responded well to retention efforts will be labeled and this input will be given back to the predictor 170 during training through the trainer 160.

Through continuous training and feedback, the predictor 170 will not only predict which customers are on the verge of defection (churn point) but will also predict which of those customers are actually worth spending retention/remediation (promotion) efforts on for optimal results.

One of the most common approaches to address customer churn is by the construction of holistic market strategy aimed to reduce customer defection on one hand and increase the acquisition of new customers on the other, such approaches are important in general. Retailers do need to maintain a good marketing strategy. However, this is only an indirect solution to customer churn. It is important to acquire new customers, but it is no substitute to the more cost-effective action of retaining current customers, which is what system 100 does by focusing on a point in time for which the churn has not yet occurred and can be remediated by the enterprise.

By leveraging the shopping patterns in conjunction with the holistic inputs of the customer, the predictor 170 can provide a more powerful predictive power of customer churn at a much earlier stage (churn point), which is currently unable to be achieved in the industry. Such will save enterprises millions of dollars a year.

During the training session, the trainer 160 provides as input to the predictor 170 the above-mentioned shopping pattern for a given customer within a given period of time (using a base of a month in terms of frequency units of time) and the above-mentioned holistic inputs for the customer; the trainer 160 also flags the expected output for the predictor 170.

The predictor 170 receives the input during the training session with the trainer 160 along with the expected output result (which initially is customer transaction history data with the customers labeled as defector or non-defector as was discussed above). The predictor 170 can be based on any machine-learning algorithm, such as for example linear regression. The predictor 170 configures itself by weighting the various features provided as input and deriving an algorithm, such that when new features are provided to the predictor 170 (transaction data over a different period that was not necessarily processed during the training session), the predictor 170 produces as a result a defector or non-defector classification for a given customer.

As efforts are made to change the behaviors of the customers labeled as defector by the enterprise over a given period of time (for instance 2 months), the predictor 170 is trained again with the expected result for the remediation efforts, such that the predictor 170 is ready to decided based on newly developed shopping patterns and holistic information for customers whether or not remediation efforts will or will not be successful if employed by the enterprise on those customers that were initially labeled as defectors.

The predictor 170 is now ready to run on a recent period of customer transaction data without expected outputs (non-training and live production mode of operation). The predictor 170 produces as output for a given customer and that customer's shopping pattern over the period two values, the first is an indication if such customer is believed to be at a churn point and defector or a non-defector and the second is a second indication if the customer was labeled a defector as to whether remediation efforts are likely to be successful or unsuccessful with that particular customer.

A listing of the labeled defectors along with the second indication as to whether the customer is likely to be receptive to retention/remediation is sent to the reporter/notifier 190. The reporter/notifier 190 is configured with business rules as to how to handle defectors not receptive to remediation and how to handle defectors receptive to remediation. The rules are customizable by the enterprise and can include automated actions that: send specific notifications to a promotion system along with customer identifier and contact details, send reports to designated individuals within the enterprise, send automated promotions directly to customer user devices 140, and others.

Results of remediation efforts can also be fed back into the trainer 160 for continuously training the predictor 170. In this way the accuracy of the predictor 170 is continuously improving.

It is to be noted that although examples discussed with the system 100 were directed to managing a potential customer that is about to defect (churn point) along with a likelihood that remediation will or will not be successful, the system 100 is not so limited and can be used for training the predictor 170 on other problems where the training input includes a modeled set of input combined with raw holistic data associated with the problems.

In an embodiment, the trainer 160, the predictor 170, the modeler 170, and the reporter/notifier 190 are provided from a cloud processing environment. In an embodiment, transaction data associated with the enterprise is also maintained in the cloud processing environment.

In an embodiment, modules 160-190 are provided as Software-as-a-Service (SaaS) to a given enterprise on a subscription basis.

In an embodiment, the transaction terminals 130 include: a Point-Of-Sale (POS) terminal, a Self-Service Terminal (SST), and/or a kiosk.

In an embodiment, the user devices 140 include: a phone, a tablet, a laptop, and/or a wearable processing device.

In an embodiment, the customer service terminals 150 are desktops, tablets, phones, laptops, and/or transaction terminals 130 configured or being used for customer service operations at any given point in time.

Figure 1B:
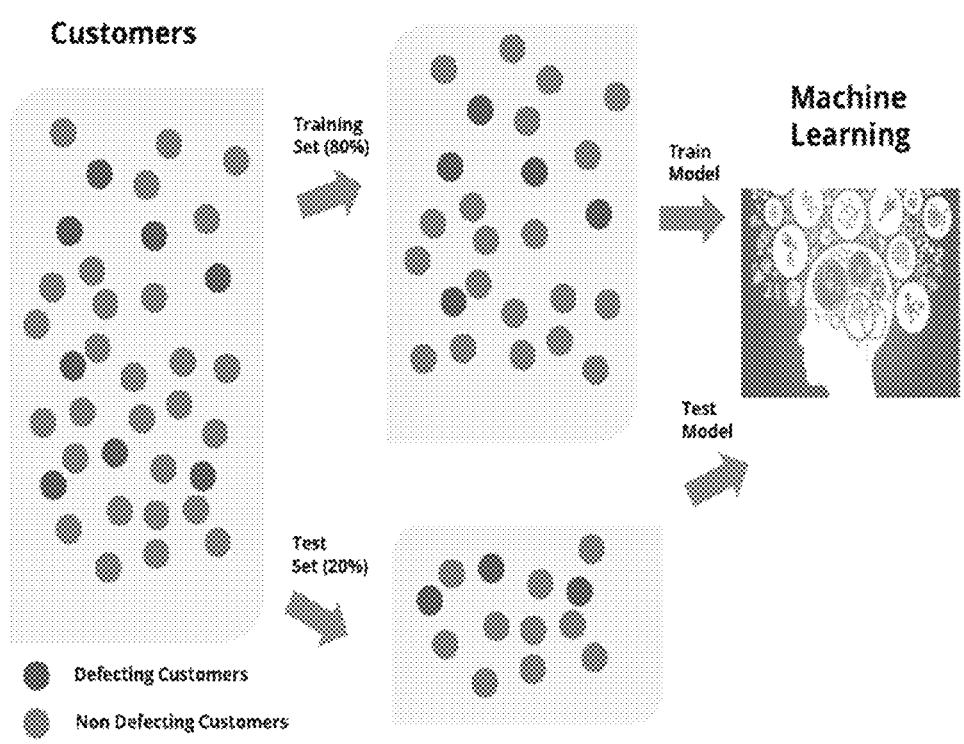
FIG. 1B is a diagram of inputs that train a machine-learning predictor for detecting deviations and remediations, according to an example embodiment.

FIG. 1B is a diagram of inputs that train a machine-learning predictor for detecting deviations and remediations, according to an example embodiment. During the training session, the trainer 160 has pre-flagged customers as defecting and non-defecting based on the configured percentage point drop in dollars spend by the customers over a period of time as was discussed above. 80% of the test data set includes the defector and non-defector customer classification provided to the predictor 170 (identified as machine learning in the FIG. 1B), the other 20% of the test data is used to test and retrain if necessary the predictor 170 based on the training that occurred with the original 80%. That is the testing during the training session by the trainer 160 hides the defector and non-defector classifications from the predictor 170 to see how well the predictor 170 is developing its underlying factors and algorithm for producing acceptable accuracy rates.

In an embodiment, the last or previous 6 months-worth of transaction data for the enterprise is used for the training session. It is also noted that training of the predictor 170 for predicting whether remediation will be successful or not occurs after the training on predicting the churn point for customers or predicting customers that are said to be defectors or non-defectors, which is what is illustrated in FIG. 1B.

Figure 1C:
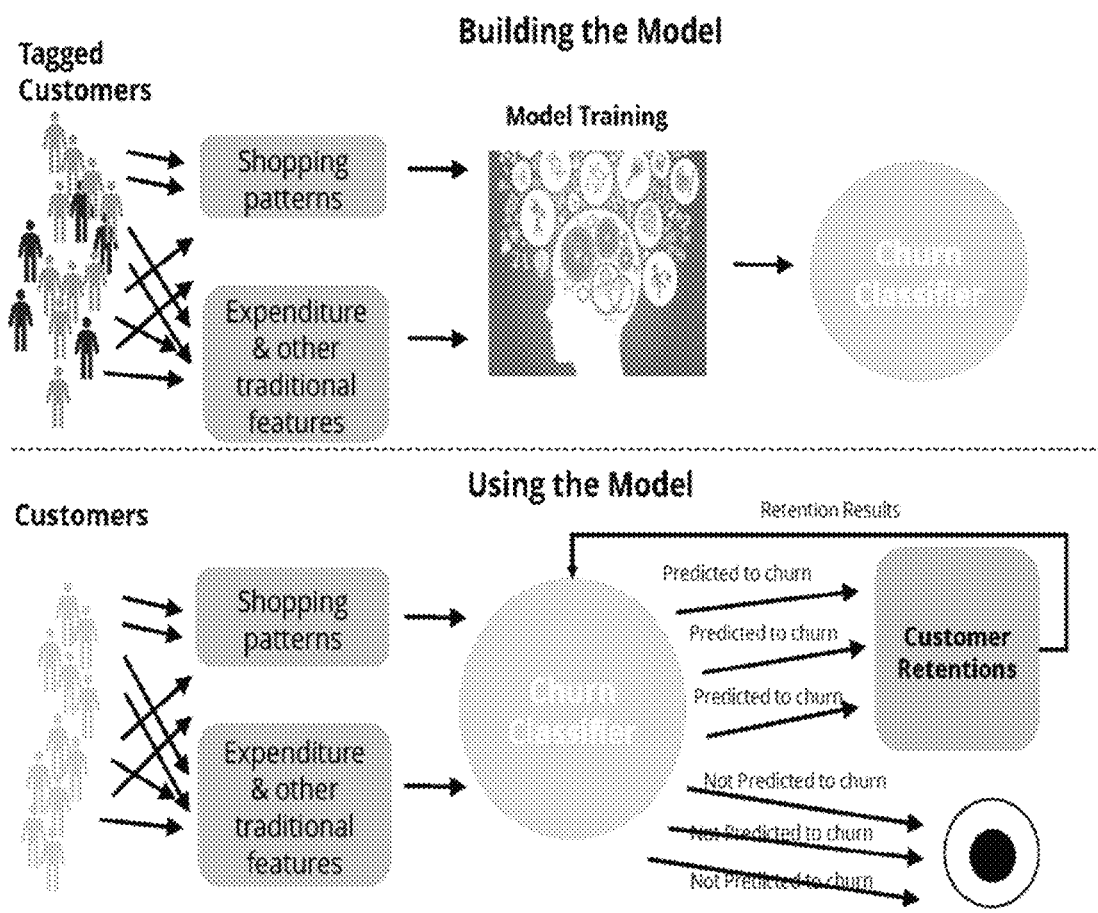
FIG. 1C is a diagram of training and using the machine-learning predictor, according to an example embodiment.

FIG. 1C is a diagram of training and using the machine-learning predictor, according to an example embodiment.

FIG. 1C illustrates that training by the trainer 160 of the predictor 170 for defectors and non-defectors takes as input: 1) a transaction data history along with pre-tagged classified customer indications for defector or non-defector, 2) the modeled shopping patterns for each customer provided by the modeler 180, and 3) the holistic customer transaction data provided by the modeler 180. This results in a trained predictor 180 (identified as "churn classifier" in the FIG. 1C). This is shown on in the top diagram of FIG. 1C.

Once the predictor 180 is released for production during which the customers are not pre-classified as defectors or non-defectors, a recent configured period of transaction data is provided and the modeler 180 updates or creates corresponding modeled shopping patterns for each customer along with holistic transaction data for the customer (as was discussed above), the churn classifier (trained version of the predictor 170) produces as output for each customer a determination as to whether that customer is a defector or non-defector. As remedial efforts are employed by the enterprise for defecting customers the success or failure of those efforts are fed back into the churn classifier 170 as input and the classifier 170 is trained to predict whether remedial efforts (promotion activity) is likely to work or not work with each classified defector.

FIG. 1D is an example set of input parameters used to train and to use the machine-learning predictor, according to an example embodiment.

The FIG. 1D illustrates a portion of a modeled shopping pattern data structure provided as input to the predictor 170 and derived by the modeler 180 from the data store 110 and transaction history over a given period of time (using months as a time interval). Rather, than model the shopping pattern on a per item basis, the pattern is based on distributions (as discussed above) for product categories using the product hierarchy of the enterprise for its available items. By clustering around the product categories rather than the individual items, it was observed that the predictor 170 was 2.3 times more accurate than when trained on a per item bases for the shopping pattern.

It is noted that the FIG. 1D shows one portion of a sampled derived shopping pattern generated by the modeler 180, as was stated above the shopping pattern for a given customer includes a data structure representing all the above-mentioned distributions, time spent, and savings as well as what is illustrated in the sample of FIG. 1D.

These and other embodiments are now discussed with reference to the FIGS. 2-4.

Figure 2:
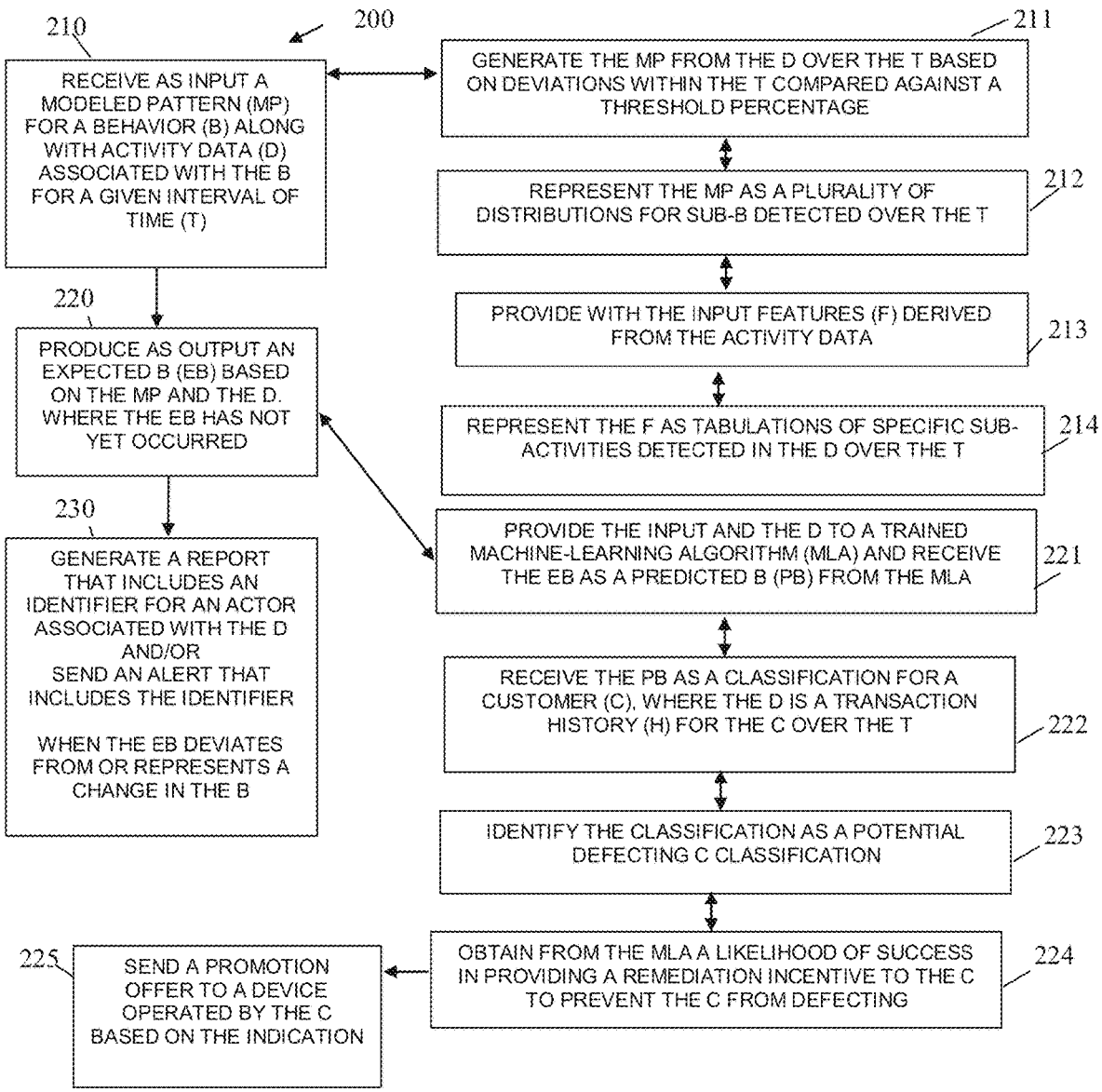
FIG. 2 is a diagram of a method for machine learning predictive deviation and remediation, according to an example embodiment.

FIG. 2 is a diagram of a method 200 for machine learning predictive deviation and remediation, according to an example embodiment. The software module(s) that implements the method 200 is referred to as a "predictive-deviation-and-remediation manager." The predictive-deviation-and-remediation manager is implemented as executable instructions programmed and residing within memory and/or a non-transitory computer-readable (processor-readable) storage medium and executed by one or more processors of a device. The processor(s) of the device that executes the predictive-deviation-and-remediation manager are specifically configured and programmed to process the predictive-deviation-and-remediation manager. The predictive-deviation-and-remediation manager has access to one or more network connections during its processing. The network connections can be wired, wireless, or a combination of wired and wireless.

In an embodiment, the device that executes the predictive-deviation-and-remediation manager is a server. In an embodiment, the server is a cloud processing environment that comprises multiple servers cooperating with one another as a single server. In an embodiment, the server is a Local Area Network (LAN) server.

In an embodiment, the device that executes the predictive-deviation-and-remediation manager is a network-edge device that is local or on an edge of a LAN of a retail store.

In an embodiment, the predictive-deviation-and-remediation manager is all of or some combination of: 160-190.

In an embodiment, the predictive-deviation-and-remediation manager is provided as a SaaS to a plurality of enterprises, each enterprise having a subscription relevant to its customers and its provided transaction and customer data.

At 210, the predictive-deviation-and-remediation manager receives as input a modeled pattern for a behavior along with activity data associated with the behavior over a given interval of time. The modeled pattern is a data structure derived from the activity data specifically for a predefined behavior.

In an embodiment, at 211, the predictive-deviation-and-remediation manager generates the modeled pattern from the activity data over the interval of time based on deviations within the time interval compared against a threshold percentage.

In an embodiment of 211 and at 212, the predictive-deviation-and-remediation manager represents the modeled pattern as a plurality of distributions for sub-behaviors detected over the interval of time within the activity data. In an embodiment, these distributions are as noted above with the sales pattern discussed with the FIGS. 1A-1D.

In an embodiment of 212 and at 213, the predictive-deviation-and-remediation manager provides with the input features derived separately from the activity data.

In an embodiment of 213 and at 214, the predictive-deviation-and-remediation manager represents the features as tabulations for specific sub-activities detected in the activity data over the interval or time. In an embodiment, the tabulations are as noted above in the FIGS. 1A-1D for the additional holistic data.

At 220, the predictive-deviation-and-remediation manager produces an expected behavior based on the modeled pattern and the activity data. The expected behavior has not occurred when the expected behavior is predicted at 220.

In an embodiment, at 221, the predictive-deviation-and-remediation manager provides the input and the activity data to a trained machine-learning algorithm and receives as back as output from the trained machine-learning algorithm the expected behavior as a predicted behavior. In an embodiment, the trained machine-learning algorithm is the predictor 170.

In an embodiment of 221 and at 222, the predictive-deviation-and-remediation manager receives the predict behavior as a classification for a customer, where the activity data is a transaction history for the customer over the interval of time.

In an embodiment of 222 and at 223, the predictive-deviation-and-remediation manager identifies the classification as a potential defecting customer classification (a customer that is at or near the churn point and is a potential customer that is likely to churn or is in the process of churning as was discussed above with the FIGS. 1A-1D).

In an embodiment of 223 and at 224, the predictive-deviation-and-remediation manager obtains from the machine-learning algorithm a likelihood of success in providing a remediation incentive to the customer to prevent the customer from defecting from a retailer associated with transactions in the transaction history.

In an embodiment of 224 and at 225, the predictive-deviation-and-remediation manager sends a promotion offer to a device registered to and operated by the customer based on the indication indicating that the remediation incentive is likely to be successful in retaining the customer for the retailer.

In an embodiment, at 230, the predictive-deviation-and-remediation manager performs one of more of: generates a report that includes an identifier for an actor associated with the activity data and/or sends an alert that includes the identifier, when the expected behavior deviates from or represents a change in the behavior.

Figure 3:
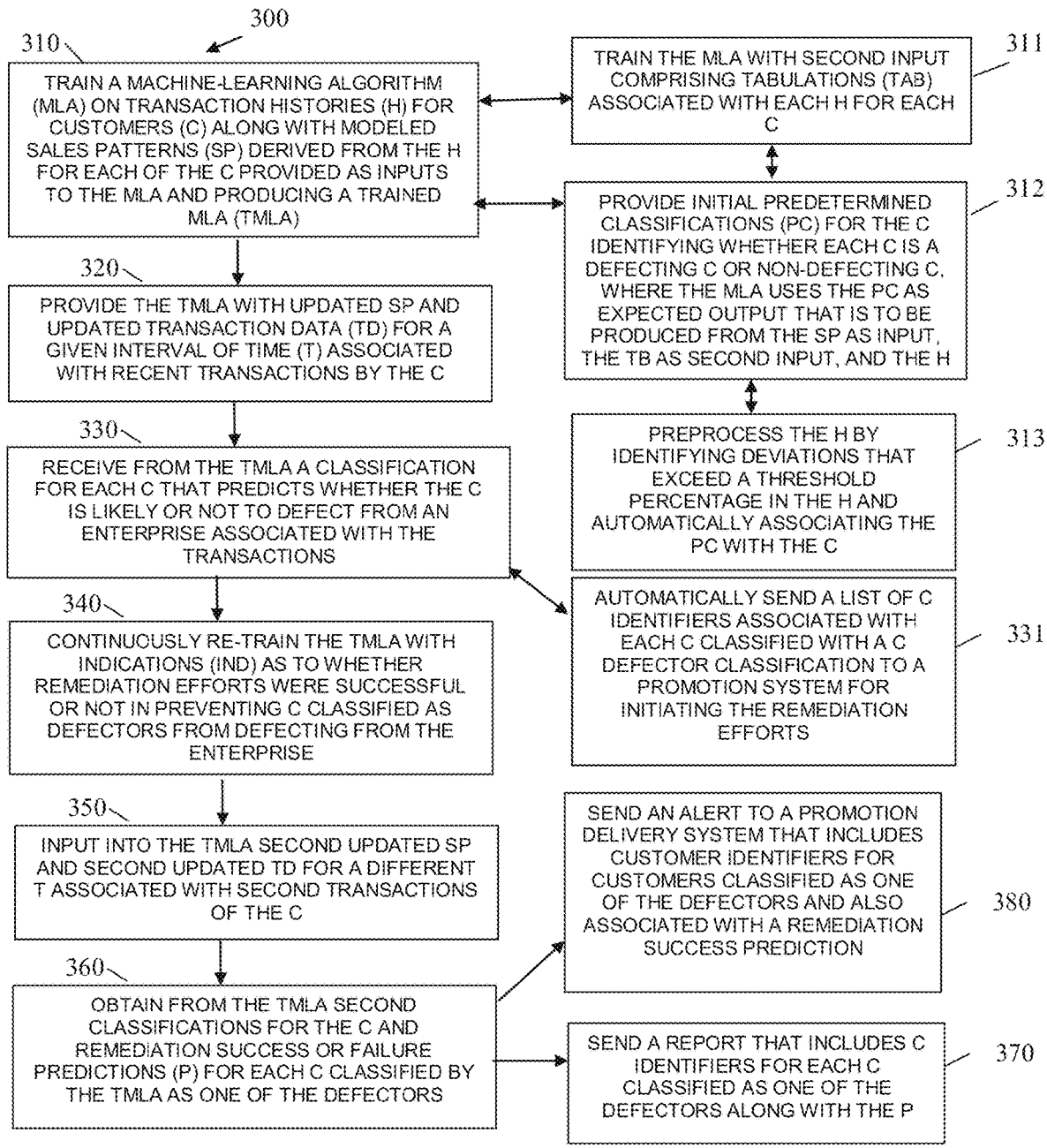
FIG. 3 is a diagram of another method for machine learning prediction of customer churn and likelihood of remediation, according to an example embodiment.

FIG. 3 is a diagram of another method 300 for machine learning prediction of customer churn and likelihood of remediation, according to an example embodiment. The software module(s) that implements the method 300 is referred to as a "churn-and-remediation predictor." The churn-and-remediation predictor is implemented as executable instructions programmed and residing within memory and/or a non-transitory computer-readable (processor-readable) storage medium and executed by one or more processors of a device. The processors that execute the churn-and-remediation predictor are specifically configured and programmed to process the churn-and-remediation predictor. The churn-and-remediation predictor has access to one or more network connections during its processing. The network connections can be wired, wireless, or a combination of wired and wireless.

In an embodiment, the device that executes the churn-and-remediation predictor is a server. In an embodiment, the server is a cloud processing environment that comprises multiple servers cooperating with one another as a single server. In an embodiment, the server is a LAN server that is local to a retail store.

In an embodiment, the device that executes the churn-and-remediation predictor is a network-edge device that is on the edge of a LAN for a retail store.

In an embodiment, the churn-and-remediation predictor is all or some combination of: 160, 170, 180, 190, and/or the method 200.

The churn-and-remediation predictor presents another and, in some ways, enhanced processing perspective to that which was described above with the FIG. 2.

At 310, the churn-and-remediation predictor trains a machine-learning algorithm on transaction histories for customers along with modeled sales patterns that are derived from the histories of each customer. The transaction histories, customer identifiers, and the modeled sales patterns are provided as inputs to the trained machine-learning algorithm. In an embodiment, the machine-learning algorithm is the predictor 170 as discussed above with the FIGS. 1A-1D. After training, the machine-learning algorithm is provided as a trained-machine learning algorithm.

In an embodiment, at 311, the churn-and-remediation predictor trains the machine-learning algorithm with second input that comprises tabulations associated with each transaction history for each customer.

In an embodiment, the input provided is the sales pattern discussed above with the FIGS. 1A-1D and the second input is the holistic data tabulated from the transaction histories as was discussed above with the FIGS. 1A-1D.

In an embodiment of 311 and at 312, the churn-and-remediation predictor provide initial predetermined classifications for the customer identifier whether each customer is a defecting customer or non-defecting customer. The machine-learning algorithm uses the predetermined classifications as expected output that the machine-learning algorithm is to produce from the sales patterns, the tabulations, and the histories.

In an embodiment of 312 and at 313, the churn-and-remediation predictor preprocesses the histories by identifying deviations that exceed a threshold percentage in the histories and by automatically associating the predetermined classifications with the customers.

At 320, the churn-and-remediation predictor provides the trained machine-learning algorithm with updated sales patterns and updated transaction data for a given interval of time associated with recent transactions by the customers.

At 330, the churn-and-remediation predictor receives from the trained machine-learning algorithm a classification for each customer that predicts whether each customer is likely or not to defect from an enterprise associated with the transactions.

In an embodiment, at 331, the churn-and-remediation predictor automatically sends a list of customer identifiers associated with each customer classified with a customer defector classification to a promotion system for initiating remediation efforts (discussed at 340 below).

At 340, the churn-and-remediation predictor continuously re-trains the trained machine-learning algorithm with indications as to whether remediation efforts (promotions) were successful or not in preventing the customers classified as defectors from defecting from the enterprise.

At 350, the churn-and-remediation predictor inputs into the trained machine-learning algorithm second updated sales patterns and second updated transaction data for a different interval of time associated with second transactions of the customers.

At 360, the churn-and-remediation predictor obtains from the trained machine-learning algorithm second classifications for the customers and remediation success or failure predictions for each customer classified by the trained machine-learning algorithm as one of the defectors.

In an embodiment, at 370, the churn-and-remediation predictor sends a report that includes customer identifiers for each customer classified as one of the defectors along with the remediation success or failure predictions for each such customer. This can be sent to a specific individual or an automated system.

In an embodiment, at 380, the churn-and-remediation predictor sends an alert to a promotion delivery system that includes customer identifiers for customers classified as one of the defectors and who are also associated with a remediation success prediction.

Figure 4:
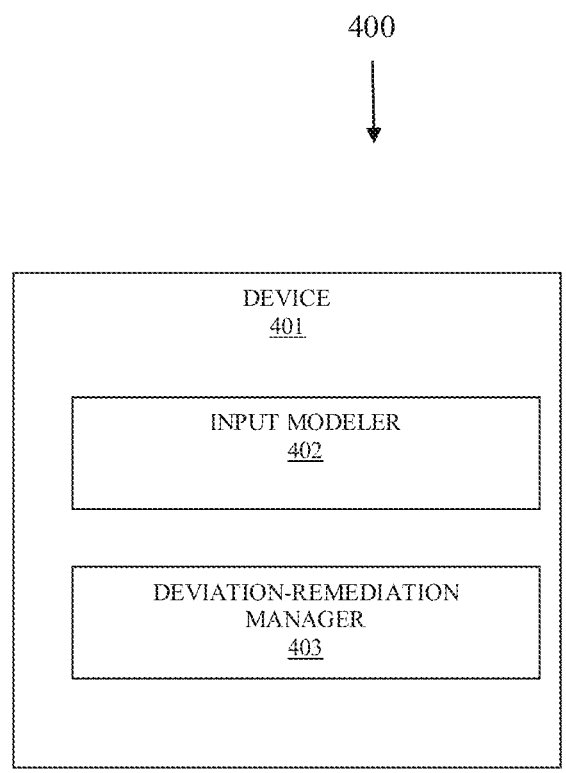
FIG. 4 is a diagram of a system for machine learning predictive deviation and remediation, according to an example embodiment.

FIG. 4 is a diagram of a system 400 for machine learning predictive deviation and remediation, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401, an input modeler 402, and a deviation-remediation manager 403.

In an embodiment, the processing device 401 is a server. In an embodiment, the server is a collection of servers that cooperate as a cloud processing environment.

In an embodiment, the processing device 401 is a network edge device.

The input modeler 402 is a set of executable instructions that is executed on one or more hardware processors of the processing device 401 from a non-transitory computer-readable storage medium or memory.

The deviation-remediation manager 403 is also a set of executable instructions that is executed on one more hardware processors of the processing device 401 from a non-transitory computer-readable storage medium or memory.

The input modeler 402, when executed by the processor(s) of the device 401, is configured to: 1) generate a sales pattern for a given customer from transaction data obtained for a given period of time, 2) generate tabulations from the transaction data, and 3) provide as input to the deviation-remediation manager 403: a customer identifier for the given customer, the transaction data, the sales pattern, and the tabulations.

In an embodiment, the input-modeler 402 is the behavior pattern modeler 180.

The deviation-remediation manager 403, when executed by the processor(s) of the device 401, is configured to: 1) process a trained machine-learning algorithm with the input, 2) receive as output from the trained machine-learning algorithm a customer classification as either a defector or a non-defector, and a remediation success value indicating whether remediation efforts are likely to be successful or unsuccessful with the customer when the customer classification is classified as the defector, 3) generate a report or send an alert when the customer classification is the defector, and 4) send a promotion to a customer device of the customer or a promotion system when the remediation success value is likely to be successful.

In an embodiment, the device 401 is a cloud-based device that provides a user-facing interface to a user over a network to configure the input modeler 402 and the deviation-remediation manager 403 for the given product catalogue at a given retail store and to supply or identify a transaction data store for obtaining the transaction data for that given retailer.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising: training, by a processor, a machine-learning algorithm on transaction histories for customers along with sales patterns derived from the transaction history for each of the customers provided as inputs to the machine-learning algorithm and producing the machine-learning algorithm, wherein each sales pattern is a data structure for each customer, the data structure comprises: a total distribution of a quantity of items purchased by the corresponding customer across product categories of a given enterprise, a total distribution of cost of the items across the product categories of the given enterprise, a total distribution of the items across channels of the given enterprise, a total distribution of savings or discounts given to the corresponding customer across the product categories, and total time per dollar spent by the corresponding customer during shopping trips of the corresponding customer with the given enterprise, wherein each data structure is produced for a given interval of time, wherein training further includes training the machine-learning algorithm for each customer on additional data for each given interval of time associated with the corresponding data structure, wherein the additional data comprises: a total number of visits of the corresponding customer for the corresponding given interval of time, a total value of transactions of the corresponding customer for the corresponding given interval of time, a total number of items purchased by the corresponding customer for the corresponding given interval or time, a total number of returned items returned by the corresponding customer for the corresponding given interval of time, a total number of service incidents that the corresponding customer visited a service desk or a service terminal of the given enterprise, and time intervals between each of the visits by the corresponding customer with the given enterprise, and training further includes labeling each customer within the corresponding transaction history with a defector label or non-defector label based on actual observed activity associated with the corresponding customer with the given enterprise;

providing, by the processor, the machine-learning algorithm with updated sales patterns and updated transaction data for a current interval of time associated with recent transactions by the customers;

receiving, by the processor, from the machine-learning algorithm a classification for each customer that predicts whether the customer is likely or not to defect from an enterprise associated with the transactions, wherein the classification is the defector label or the non-defector label;

continuously retraining, by the processor, the machine-learning algorithm with indications as to whether remediation efforts were successful or not in preventing customers classified as defectors from defecting from the enterprise for the machine-learning algorithm to additionally output an indication of whether the remediation efforts are likely or not likely to be successful in moving a defector labeled customer to a non-defector labeled customer;

inputting into the machine-learning algorithm, by the processor, second updated sales patterns and second updated transaction data for a different interval of time associated with second transactions of the customers; and obtaining from the machine-learning algorithm, by the processor, second classifications for the customers and remediation success or failure predictions for each customer classified by the machine-learning algorithm as one of the defectors.

2. The method of claim 1 further comprising, sending a report that includes customer identifiers for each customer classified as one of the defectors along with the remediation success or failure predictions.

3. The method of claim 1 further comprising, sending an alert to a promotion delivery system that includes customer identifiers for customers classified as one of the defectors and who are also associated with a remediation success prediction.

4. The method of claim 1, wherein training further includes train the machine-learning algorithm with second input comprising tabulations associated with each of the transaction histories for each of the customers.

5. The method of claim 4, wherein training further includes providing initial predetermined classifications for the customers identifying whether each customer is a defecting customer or non-defecting customer, wherein the machine-learning algorithm uses the initial predetermined classifications as expected output that is to be produced by the machine-learning algorithm from the inputted sales patterns, the tabulations, and the transaction histories.

6. The method of claim 5, wherein providing the initial predetermined classifications further includes preprocessing the transaction histories by identifying deviations that exceed a threshold percentage in the transaction histories and automatically associating the initial predetermined classifications with the customers.

7. The method of claim 1, wherein receiving further includes automatically sending a list of customer identifiers associated with each customer classified with a customer defector classification to a promotion system for automated initiation of the remediation efforts.

* * * * *